US011824761B1

(12) United States Patent
Jones

(10) Patent No.: US 11,824,761 B1
(45) Date of Patent: Nov. 21, 2023

(54) IDENTIFYING ALIGNMENT MARKERS USING PARTIAL CORRELATORS

(71) Applicant: Xilinx, Inc., San Jose, CA (US)

(72) Inventor: Ben J. Jones, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 102 days.

(21) Appl. No.: 16/199,744

(22) Filed: Nov. 26, 2018

(51) Int. Cl.
- *H04L 45/24* (2022.01)
- *H04L 25/14* (2006.01)
- *H04L 1/00* (2006.01)

(52) U.S. Cl.
CPC ............ *H04L 45/24* (2013.01); *H04L 1/0045* (2013.01); *H04L 25/14* (2013.01)

(58) Field of Classification Search
CPC ... H04L 1/0045; H04L 1/0063; H04L 1/0041; H04L 1/203; H04L 1/00; H04L 1/0057; H04L 1/0083; H04L 25/14; H04L 25/085; H04L 25/03; H04L 25/4908; H04L 25/0272; H04L 25/49; H04L 25/08; H04L 45/24; H04L 45/745; H04L 45/245; H04L 45/28; H04L 45/66; H04L 47/805; H04L 47/34; H04L 47/745; H04L 47/2433; H04L 47/2483; H04L 49/552; H04L 7/043; H04L 7/044; H04L 7/04; H04L 7/048; H04L 7/00; H04L 7/0054; H04L 7/00047; H04L 7/0016; H04L 7/0079; H04L 65/601; H04L 29/06; H04L 29/02; H04L 29/00

See application file for complete search history.

(56) References Cited

U.S. PATENT DOCUMENTS

| 7,991,296 | B1* | 8/2011 | Johnston | ............... H04J 3/0608 398/154 |
| 9,876,709 | B1 | 1/2018 | Jones | |
| 2002/0077995 | A1* | 6/2002 | Allison | .................. G06F 1/3209 |
| 2003/0128449 | A1* | 7/2003 | Dati | ................. G11B 20/10296 360/39 |
| 2004/0117584 | A1* | 6/2004 | Banerjee | .................... G06F 5/01 711/201 |
| 2005/0144342 | A1* | 6/2005 | Renaud | ................. G06F 13/385 710/52 |
| 2006/0077079 | A1* | 4/2006 | Antonin | ............ G06F 16/90344 707/E17.042 |
| 2006/0153195 | A1* | 7/2006 | Rytting | ............... G01R 31/3177 370/394 |
| 2007/0136764 | A1* | 6/2007 | Bajgrowicz | ........ H04N 21/6143 725/100 |
| 2008/0232509 | A1* | 9/2008 | Jonsson | ................... H04L 7/043 375/296 |
| 2009/0003459 | A1* | 1/2009 | Limberg | .................... H04L 1/08 375/240.26 |
| 2009/0274247 | A1* | 11/2009 | Galbraith | ......... G11B 20/10046 375/341 |

(Continued)

*Primary Examiner* — Un C Cho
*Assistant Examiner* — Rasha K Fayed
(74) *Attorney, Agent, or Firm* — Paradice & Li LLP

(57) ABSTRACT

Methods and apparatus for detecting alignment markers in received data streams received via a plurality of data lanes are disclosed. Corresponding data streams may be received via respective data lanes in the plurality of data lanes, where each data stream includes alignment markers delineating data frames, and each alignment marker has a predefined bit pattern. For each respective data lane, a determination is made whether a specified portion of the received data stream has at least a threshold degree of similarity with a portion of the predefined bit pattern. In response to determining, for one of the plurality of data lanes, that the specified portion has at least the threshold degree of similarity, a frame boundary may be determined based on the specified portion, and a verification may be performed, that the specified portion of the received data stream corresponds to an alignment marker.

18 Claims, 3 Drawing Sheets

(56) References Cited

U.S. PATENT DOCUMENTS

| | | | | |
|---|---|---|---|---|
| 2010/0199334 A1* | 8/2010 | Ehrensvard | ............ | G06F 21/34 |
| | | | | 713/168 |
| 2011/0161363 A1* | 6/2011 | Weir | ................ | G06F 16/90344 |
| | | | | 707/769 |
| 2012/0106780 A1* | 5/2012 | Ellis | .................. | H04N 1/32309 |
| | | | | 382/100 |
| 2012/0163480 A1* | 6/2012 | Nemeth | ................ | H04B 1/707 |
| | | | | 375/259 |
| 2013/0262941 A1* | 10/2013 | Wang | ..................... | H04L 1/203 |
| | | | | 714/712 |
| 2014/0006670 A1* | 1/2014 | Wagh | ................. | G06F 13/4027 |
| | | | | 710/305 |
| 2014/0177377 A1* | 6/2014 | Kumar | ................. | G11C 29/023 |
| | | | | 365/233.12 |
| 2015/0089319 A1* | 3/2015 | Ghiasi | ................. | H04L 1/0063 |
| | | | | 714/758 |
| 2015/0120955 A1* | 4/2015 | Wang | ................. | H04L 47/2483 |
| | | | | 709/231 |
| 2015/0256206 A1* | 9/2015 | Nakagata | .......... | H03M 13/2906 |
| | | | | 714/759 |
| 2016/0056886 A1* | 2/2016 | Kitamura | .............. | H04L 47/745 |
| | | | | 398/5 |
| 2016/0187859 A1* | 6/2016 | Matsue | ................. | G04R 20/06 |
| | | | | 368/47 |
| 2017/0053012 A1* | 2/2017 | Levy | ................... | H04L 45/7457 |
| 2017/0285960 A1* | 10/2017 | Yap | ..................... | H03M 7/3084 |
| 2019/0045030 A1* | 2/2019 | Kounavis | .......... | H04L 29/12839 |
| 2020/0228229 A1* | 7/2020 | Farjadrad | ................ | H04L 47/25 |

\* cited by examiner

IDENTIFYING ALIGNMENT MARKERS USING PARTIAL CORRELATORS

TECHNICAL FIELD

Aspects of the present disclosure generally relate to communication systems, and more particularly to aligning data received via multiple parallel lanes.

BACKGROUND

Communication systems commonly divide transmitted data into frames, with various forms of control information inserted in or between the frames to ensure that the transmitter and receiver are synchronized. For example, in the IEEE 802.3ba standard for 40 gigabits per second (Gbps) and 100 Gbps Ethernet physical layer, data is transferred using multiple parallel data lanes. Data can arrive at the receiver with some relative timing offset or "skew" between the data lanes. Accordingly, control information, in the form of alignment markers (AMs), is inserted periodically into the data stream to allow the receiver to find frame boundaries on each data lane and then remove the skew between data lanes so that the data can be recovered correctly. The 802.2bj standard defines forward error correction (FEC) features for use on the 40 Gbps/100 Gbps Ethernet physical layer over backplanes and copper cables. In FEC data lanes, the AMs have the same format as in data lanes without FEC defined in IEEE 802.3ba but are distributed in a different pattern within the transmitted frames.

The standard method for locating AMs in a data stream is to perform a bitwise correlation operation at each location where an AM might be located, searching for a known bit pattern. With high bitrates, such as 100 Gbps, this correlation operation is not straightforward. Either a very large number of correlation circuits are required, operating in parallel, or else a smaller number (such as a single correlator) can be swept across the data until alignment is found. With a large bank of correlators, alignment may be quick (for example, around 200 µs), but has a high cost in terms of silicon area and power consumption. With a single correlator, silicon cost and power consumption are low, but alignment may be slow, having a best case on the order of 10 ms.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to detecting alignment markers in data streams received via a plurality of data lanes. In one example, a method is disclosed. The method may include receiving corresponding data streams via respective data lanes in the plurality of data lanes, each data stream including alignment markers delineating data frames, each of the alignment markers having a predefined bit pattern, for each respective data lane, and determining whether or not a specified portion of the received data stream has at least a threshold degree of similarity with a portion of the predefined bit pattern. In response to determining, for one of the plurality of data lanes, that the specified portion has at least the threshold degree of similarity, a frame boundary may be determined based on the specified portion, and a verification may be made that the specified portion of the received data stream corresponds to an alignment marker.

In another example, an alignment detection circuit is disclosed. The alignment detection circuit may include a data input circuit configured to receive a plurality of data streams via a corresponding plurality of data lanes, each data stream including alignment markers delineating data frames, each of the alignment markers having a predefined bit pattern. The alignment detection circuit may further include a plurality of partial correlators, each of the partial correlators configured to receive a corresponding data stream and determine whether or not a specified portion of the corresponding data stream has at least a threshold degree of similarity with a portion of the predefined bit pattern. The alignment detection circuit may further include an alignment adjustment circuit configured to adjust an alignment of each data stream of the plurality of data streams, wherein a given data stream's alignment is adjusted based on one of the partial correlators determining that the specified portion of the corresponding data stream has at least the threshold degree of similarity with the predefined bit pattern. The alignment detection circuit may further include a full correlator configured to verify that the specified portion of the received data stream having at least the threshold degree of similarity also corresponds to an alignment marker.

In another example, an alignment detection circuit is disclosed. The alignment detection circuit may include one or more processors, and a memory storing instructions that, when executed by the one or more processors, cause the latency determination circuit to perform operations including receiving corresponding data streams via respective data lanes in a plurality of data lanes, each data stream including alignment markers delineating data frames, each of the alignment markers having a predefined bit pattern, for each respective data lane, and determining whether or not a specified portion of the received data stream has at least a threshold degree of similarity with a portion of the predefined bit pattern. In response to determining, for one of the plurality of data lanes, that the specified portion has at least the threshold degree of similarity, a frame boundary may be determined based on the specified portion, and a verification may be made that the specified portion of the received data stream corresponds to an alignment marker.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

Figure 1:
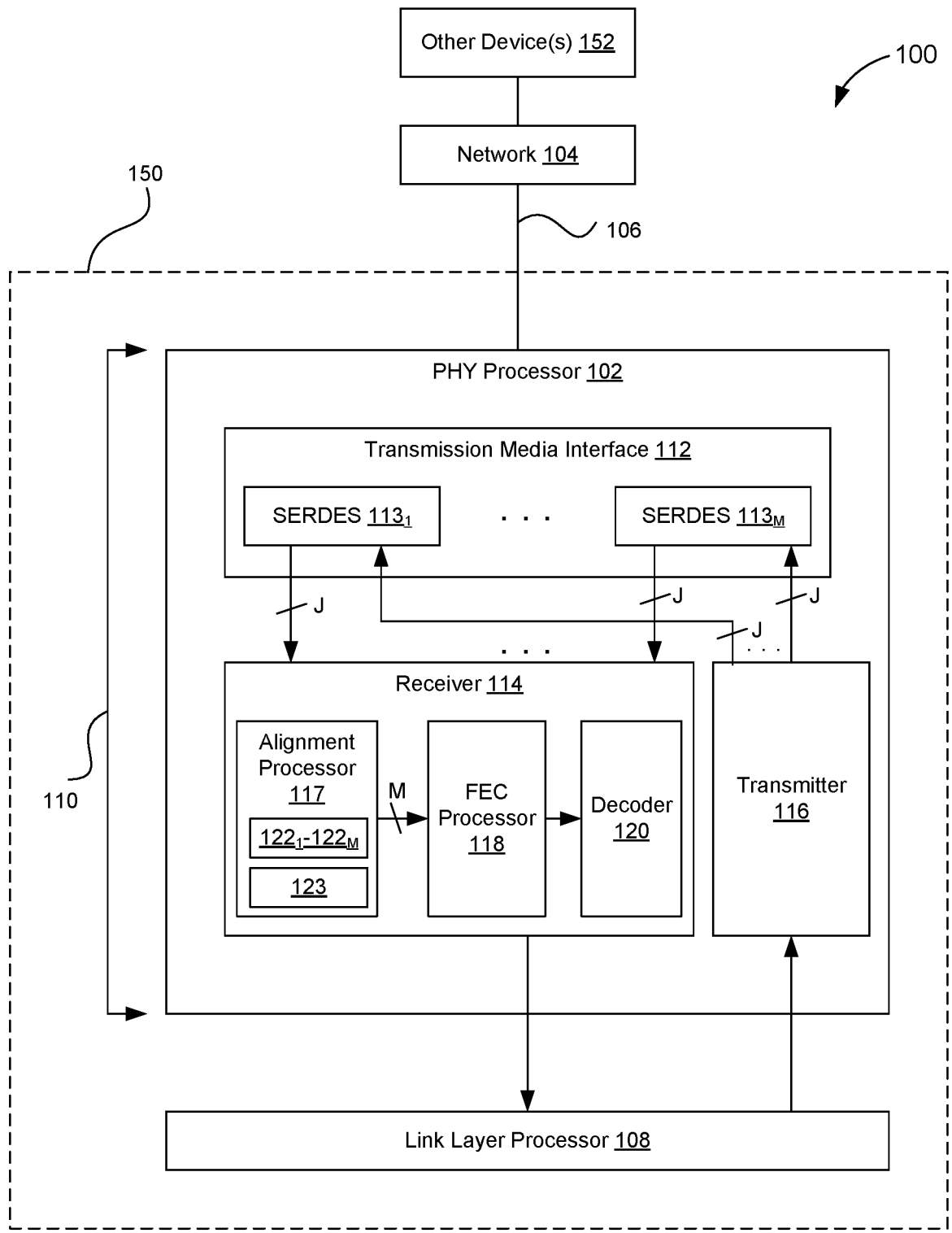
FIG. 1 shows an example communication system, according to some implementations.

Alignment detection in a multi-lane network interface is described. In general, an alignment circuit ("alignment processor") is configured to align data streams on data lanes of the multi-lane network interface to remove inter-lane skew. In example implementations, the multi-lane network interface may comprise a high-speed Ethernet interface (e.g., 40

Gbps or 100 Gbps) employing forward error correction (FEC), such as that defined in the IEEE 802.3bj standard. Such a high-speed Ethernet interface may include a plurality of FEC data lanes, each receiving a data stream including periodic groups of alignment markers (AMs) defining data frames. The alignment processor however, can operate within other multi-lane network interfaces having the same or similar data stream structures as described herein.

The alignment processor can include an alignment detection circuit for each data lane. Each alignment detection circuit may obtain a lock onto AMs and locate frame boundaries in the data stream of a respective data lane. AMs of the high-speed Ethernet interface have a specific symmetry in that the first half of each AM is the bitwise inverse of the second half. The alignment detection may exploit this symmetrical property of the AMs in order to perform "pre-screening" of the captured data on a block-by-block basis. The alignment detection circuit may measure symmetry in successive blocks of the data stream to obtain measures of symmetry which may be referred to as "symmetry scores" or simply "scores." The alignment detection circuit may collect symmetry scores for data blocks over one or more data frames, which may be used as a measure of probability that given data blocks include one or more AMs. The alignment detection circuit may compare the symmetry scores against threshold scores to identify data blocks most likely to include AMs ("candidate data blocks"). That is, each candidate data block has a measure of symmetry that satisfies a threshold metric indicative of one or more AMs. A correlator may perform a more detailed analysis of only the candidate blocks to search for AMs, filter out any false positive matches, and establish a start location in a data frame in case of a correct match. Once each alignment detection circuit has located the frame boundaries, the alignment processor may remove inter-lane skew.

Conventional alignment processors may detect alignment markers in each of the data streams by using a number of correlators, each configured to compare a data stream with the bit pattern of the alignment markers and determine whether a threshold number of groups of bits match. For example, the alignment marker may be 6 bytes long, and may have a bit pattern including 12 4-bit (or nibble) sequences. A conventional alignment processor may detect an alignment marker in a given data stream by determining that 9 nibbles match out of the 12 nibble pattern. Such a correlator may be referred to as a "full correlator." Determining that 9 nibbles out of a 12 nibble sequence match may better allow for alignment marker detection in the presence of noise by incorporating a degree of inexactness. Conventional alignment processors may include a large parallel bank of such correlators, however, there may be a large cost both in circuit complexity (e.g., silicon area), and in power consumption, for the use of such correlators. Reducing the number of correlators in the parallel bank may reduce the complexity, but at the cost of increased search time required for locating the alignment markers. It would therefore be desirable to reduce the complexity and power consumption of an alignment processor, without increasing the search time.

Accordingly, the example implementations provide for detection of alignment markers using a parallel bank of partial correlators, each of which is configured to detect a lesser number of matching nibbles of the alignment marker than the full correlator described above. For example, rather than matching 9 of 12 nibbles, each partial correlator may determine whether 5 of 8 nibbles match the pattern of the alignment marker, 4 of 7 nibbles, 3 of 6 nibbles, and so on.

Such partial correlators may be simpler and consume less power than the full correlators described above. Further, a single full correlator may be incorporated to verify that a potential match detected by a partial correlator is not a false positive.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

FIG. 1 is a block diagram depicting a communication system 100 according to an example implementation. The communication system 100 comprises a network interface 110 coupled to a network 104 through a transmission medium 106. The network interface 110 may be part of a larger device 150, such as an integrated circuit (IC). In an example implementation, the network interface 110 may implement a high-speed Ethernet interface having multiple data lanes with FEC, such as that defined in the IEEE 802.3bj standard. The network interface 110 may include a physical layer (PHY) processor 102 coupled to a link layer processor 108. The PHY processor 102 may handle the PHY layer of the high-speed Ethernet interface, while the link layer processor 108 may handle the media access control (MAC) layer of the Ethernet interface. The network interface 110 may receive a bitstream from the network 104 over the transmission medium 106, for example transmitted by other devices 152. The transmission medium 106 may generally include, for example, an optical or electrical backplane, optical or electrical cable, or the like.

The PHY processor 102 may include a transmission media interface 112, a receiver 114, and a transmitter 116. The transmission media interface 112 may receive bitstreams from, and transmit bitstreams to, the transmission medium 106 at a particular effective bitrate, for example, 40 Gbps or 100 Gbps. The transmission media interface 112 may handle a physical medium dependent (PMD) sub-layer of the PHY layer. The transmission media interface 112 may include serializer/deserializer (SERDES) circuits $113_1$ through $113_M$, where M is an integer greater than 1. Each SERDES $113_1$-$113_M$ de-serializes a received serial bitstream and provides a J-bit wide data stream, where J is an integer greater than 1. Thus, the transmission media interface 112 provides J-bit wide data streams on M parallel data lanes to the receiver 114. In the high-speed Ethernet interface defined in IEEE 802.3bj, M is equal to 4. The SERDES $113_1$-$113_M$ also respectively serialize J bit wide data streams provided over M parallel data lanes from the transmitter 116 for transmission as M serial bitstreams over the transmission medium 106.

The receiver 114 may include an alignment processor 117, an FEC processor 118, and a decoder 120. The alignment processor 117 may include alignment detection circuits $122_1$ through $122_M$ (collectively "alignment detection circuits 122"). Each of the alignment detection circuits 122 may obtain a lock to the alignment markers and locate frame boundaries in the data stream of a respective data lane. For example, as discussed below, each of the alignment detection circuits 122 may be a partial correlator, which may identify a partial match of the bit pattern of an alignment marker. The alignment processor 117 may further include a full correlator 123 to verify that a partial match of the bit pattern of an alignment marker is not a false positive, that is that the partial match actually corresponds to an identified alignment marker. The alignment processor 117 further removes skew from the data streams across the data lanes and provides M aligned and de-skewed data streams to the FEC processor 118. The FEC processor 118 may reorder and multiplex the data streams and perform FEC processing to recover message symbols from FEC codewords. For example, the FEC processor 118 may perform functions of Reed-Solomon (RS) decoding to recover 257 bit symbols from RS codewords, and 256 B/257 B to 64 B/66 B transcoding to recover 66 bit symbols from messages of 257 bit symbols. The FEC processor 118 may provide an error-corrected data stream to the decoder 120. The decoder may handle a physical coding sublayer (PCS) of the PHY layer. The decoder 120 may decode the error-corrected data stream to generate a decoded data stream. The decoder 120 may provide the decoded data stream to the link layer processor 108 for further layer-2 processing.

Figure 2:
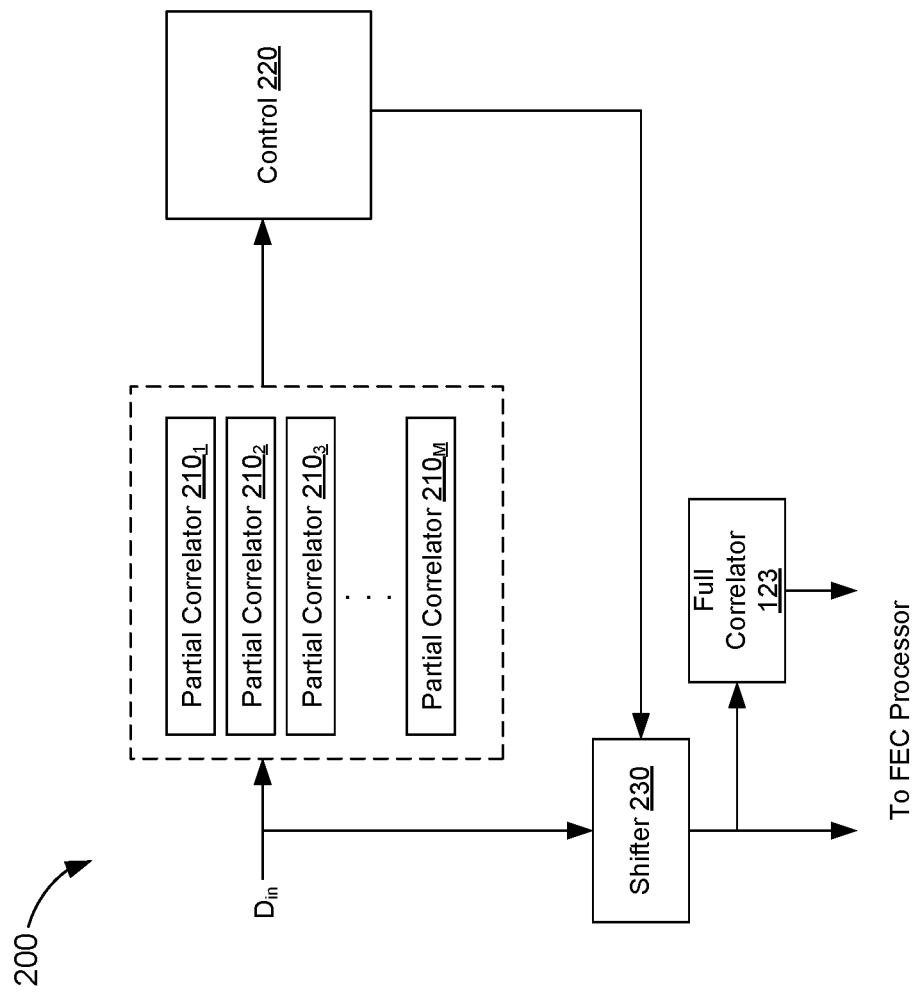
FIG. 2 shows an example alignment processor, in accordance with some implementations.

FIG. 2 is a block diagram depicting an example alignment processor 200, in accordance with some implementations. Alignment processor 200 may, for example, be one implementation of alignment processor 117 of FIG. 1. With respect to FIG. 2, a plurality of data streams Din may be received. As discussed above, the plurality of data streams may include M J-bit-wide data streams provided from transmission media interface 112 via a plurality of M parallel data lanes. The plurality of data streams Din may be provided to a plurality of partial correlators $210\text{-}210_M$ (collectively "partial correlators 210"). The partial correlators 210 may be one example of the alignment detection circuits 122 of FIG. 1. Each of the partial correlators 210 may receive a respective data stream of the plurality of data streams Din via a corresponding data lane. Each data stream includes multiplexed data, so the information transmitted on any single data lane cannot be correctly interpreted until aligned and recombined with information on the other data lanes. Thus, the output of the alignment processor 200 is to output an aligned and deskewed plurality of data streams so that this recombination and interpretation may be accomplished (for example using FEC processor 118 and decoder 120 of FIG. 1). Each of the partial correlators may include a buffer to buffer an input data stream of the plurality of data streams Din (not shown for simplicity). For example, such a buffer may form and output words of a specified length, such as a 4-bit length from the input data stream. Each of the partial correlators 210 may perform a partial correlation of its respective data stream with the bit pattern of the alignment marker, as discussed below.

When a potential match is found by one of the partial correlators 210, the partial correlator may send an indication to control 220. Control 220 may receive the indication of the potential match and note the relevant details, such as which partial correlator registered the potential match, which data lane and data stream the potential match corresponds to, the timing of the potential match, and so on.

After receiving and registering the details of the potential matches from one or more of the partial correlators 210, control 220 may send these details to shifter 230. Shifter 230 may also receive the plurality of data streams Din and may align and deskew the plurality of data streams based on the details provided by control 220. More particularly, a data stream may be aligned to have frame boundaries based on the location of a potential alignment marker. For example, the shifter 230 may selectively add or drop one or more bits of the data streams based on a location of a potential alignment marker to adjust the alignment of the corresponding data stream. Thus, when each data stream has been aligned, the skew among the plurality of data streams may be removed, so that data may be correctly recovered, as discussed above.

Because the partial correlators 210 do not perform full correlations of the data streams, a potential for false positives exists. In other words, there is a chance that a potential match of an alignment marker matches a portion of the bit pattern of the alignment marker by chance. While such false positives may be rare when the partial correlators are appropriately configured, as discussed further below, a full correlator 123 may be provided in the alignment processor 200, to examine potential matches from the partial correlators 210 and identify false positives. Further, the full correlator 123 may indicate when a potential match corresponds to detection of an alignment marker, for example sending an indication to the FEC processor. In other implementations, recognizing that false positives are considerably less common than detected alignment markers, the full correlator 123 may send an indication when a false positive is detected, for example, indicating that the FEC processor should not treat the plurality of data streams as aligned and deskewed. In another implementation, the full correlator may send an indication to the shifter 230 when a false positive is detected, indicating that the corresponding data stream has yet to be properly aligned. In one implementation, alignment of the data streams may be performed based on the detection of a potential match, before the full correlator 123 detects whether or not the potential match is a false positive. If the full correlator 123 determines that the potential match is not a false positive, then a determination is made that the performed alignment results in proper alignment of the data streams, and should be accepted—for example, as discussed above, a notification may be sent to the FEC processor that the data streams have been aligned. If the full correlator 123 determines that the potential match is a false positive, then a determination is made that the performed alignment does not result in proper alignment of the data streams, and that the alignment processor must wait for another potential match to investigate before the data streams are aligned. In the latter case, as discussed above, in some implementations a notification may be sent to the FEC processor that the data streams are not yet aligned.

As discussed above, in conventional alignment processors may include a plurality of full correlators, which may each compare a data stream with the bit pattern of the alignment marker and determine a match if a threshold degree of similarity is detected. For example, the bit pattern of the alignment marker may include 12 4-bit sequences (12 nibbles or 48 bits), and the full correlator may detect a match when a 48 bit portion of the data stream includes 9 nibbles matching the bit pattern of the alignment marker. While conventional alignment processors include a plurality of such full correlators, the example implementations instead provide the plurality of partial correlators 210. Partial correlators 210 may examine sequences of bits shorter than the length of the alignment marker and determine whether a sequence of bits has a threshold degree of similarity with a portion of the bit pattern of the alignment marker. For example, if the alignment marker includes 12 nibbles, then each partial correlator may examine a shorter bit sequence (less than 12 nibbles) of the data stream and determine whether a threshold number of nibbles match. In one example, each partial correlator may examine a 6 nibble portion of the data stream to determine whether 3 nibbles of the 6 nibble portion match nibbles of the alignment marker's bit pattern. Thus, each partial correlator may determine a potential alignment marker when 3 nibbles of 6 match. In other examples, each partial correlator may determine a potential alignment marker when 4 nibbles of 7 match, when 5 nibbles of 8 match, when 6 nibbles of 9 match, and so on.

As mentioned above, using the partial correlators 210 instead of a plurality of full correlators may allow for savings in hardware complexity and power consumption. Further, when the size of each partial correlator is appropriately chosen, false positives will be rare, and may easily be identified using the full correlator 123. The reduction in hardware complexity may be estimated based on the size of each partial correlator. For example, smaller partial correlators, such as partial correlators which determine a potential alignment marker when 3 nibbles of 6 match, may deliver increased savings in hardware complexity as compared to larger partial correlators, such as partial correlators that determine a potential alignment marker when 5 nibbles of 8 match. This increased savings in hardware complexity comes at the cost of increased chances of false positives.

The reduction in hardware complexity and power consumption for the example implementations compared to conventional alignment processors may be estimated based on the difference in size of the partial correlators 210 as compared to full correlators. For example, when the full correlators determine a match when 9 nibbles of 12 match the bit pattern of the alignment marker, partial correlators which determine a potential match when 5 nibbles of 8 match may result in reduction in hardware complexity of roughly 33%

$$\left(\frac{12-8}{12} = 33\%\right).$$

Similarly, partial correlators which determine a potential match when 3 nibbles of 6 match may result in a reduction in hardware complexity of roughly 50%

$$\left(\frac{12-6}{12} = 50\%\right).$$

Similarly, partial correlators which match 4 nibbles of 7 may correspond to a reduction of roughly 42%, and partial correlators which match 6 nibbles of 9 may correspond to a reduction of roughly 25%.

Because the data streams received at respective partial correlators include bitstreams which have been scrambled, for example using a shift register such as a linear-feedback shift register (LFSR), the estimated false positive rate may be estimated by treating the data streams as random. Thus, the chance that a random nibble matches a predetermined nibble (such as a nibble of the bit pattern of an alignment marker) is $$\left(\frac{1}{2}\right)^4 = \frac{1}{16}.$$

Similar calculations may be used for determining the false positive rate for each partial correlator. For example, for a partial correlator which determines a potential match when 3 nibbles of 6 match, the false positive rate may be a sum of the probability that 3 nibbles of 6 match by chance plus the probability that 4 nibbles of 6 match by chance plus the probability that 5 nibbles of 6 match by chance plus the probability that all 6 nibbles match by chance. Thus:

$$P(\text{at least 3 nibbles of 6 match by chance}) =$$

$$6 \text{ choose } 3 \times \left(\frac{1}{16}\right)^3 \times \left(\frac{15}{16}\right)^3 + 6 \text{ choose } 4 \times \left(\frac{1}{16}\right)^4 \times \left(\frac{15}{16}\right)^2 +$$

$$6 \text{ choose } 5 \times \left(\frac{1}{16}\right)^5 \times \left(\frac{15}{16}\right)^1 + 6 \text{ choose } 6 \times \left(\frac{1}{16}\right)^6 \times \left(\frac{15}{16}\right)^0 =$$

$$20 \times 0.000244 \times 0.824 + 15 \times 0.00001526 \times 0.879 +$$

$$6 \times 0.0000009537 \times 0.9375 + 1 \times 0.0000000596 \approx$$

$$0.00402 + 0.000201 + 0.00000536 + 0.0000000596 \approx 0.00423.$$

Thus, the estimated false positive rate for each partial correlator which registers a potential alignment marker when 3 nibbles of 6 match is approximately Alignment processors may test dozens of bit sequences per clock cycle for potential alignment markers—for example between 40 and 80 sequences per clock cycle. For an alignment marker testing 40 sequences per clock cycle for 3 nibbles of 6 matching, the expected number of false positives per clock cycle may also be estimated. For example, the probability for zero false positives in a clock cycle may be given by $(1-0.00423)^{40} \approx 0.844$—that is, roughly 84% of clock cycles should expect no false positives. The probability for a single false positive may be given by $40 \times (1-0.00423)^{39} (0.00423)^1 \approx 0.143$. Similar calculations show the probability for 2 false positives is roughly 0.012, and the probability for 3 false positives is roughly Thus, only roughly 16% of clock cycles may be expected to include at least one false positive, and of that 16% of clock cycles, most (over 85%) will be expected to include only a single false positive.

Increasing the size of the partial correlators 210 may further reduce the false positive rate, while still allowing for significant reductions in hardware complexity as compared to conventional alignment processors. For example, similar calculations to those above show that partial correlators which match 5 nibbles from 8 may have a false positive rate of roughly 1 in 22,000 while allowing for a roughly 33% reduction in hardware complexity. Such calculations show that the probability for 0 false positives in a clock cycle is estimated to be roughly 99.8%, and the probability for a single false positive in a clock cycle is roughly 0.18%, with more than one false positive in a clock cycle very unlikely.

Figure 3:
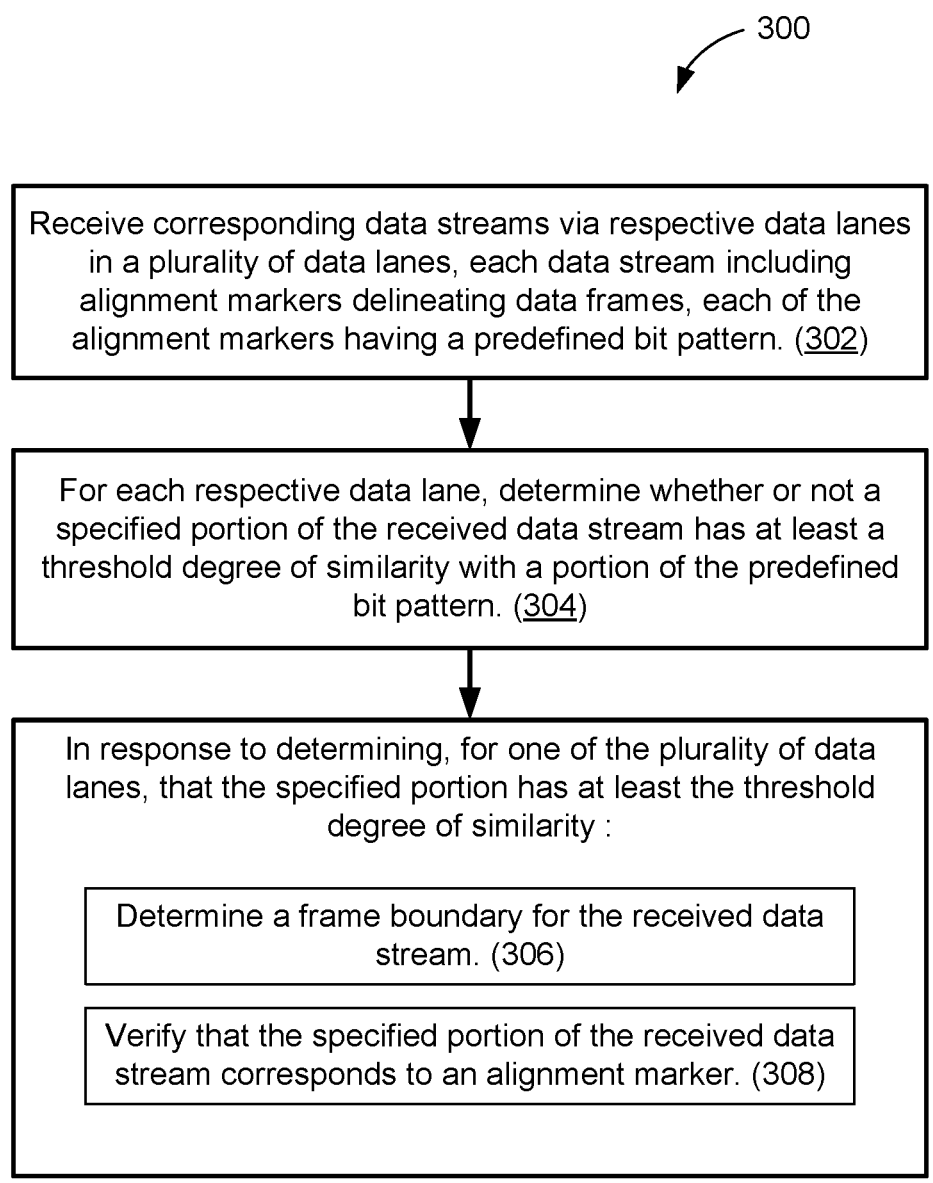
FIG. 3 is an illustrative flow chart depicting an example operation for detecting alignment markers in data streams, in accordance with some implementations.

FIG. 3 is an illustrative flow chart of an example operation 300 for detecting alignment markers in data streams received via a plurality of data lanes, in accordance with the example implementations. Operation 300 may be performed by any suitable device, such as alignment processor 117 of receiver 114 of FIG. 1, or by alignment processor 200 of FIG. 2, or using another suitable device. With respect to FIG. 3, corresponding data streams may be received via respective data lanes in the plurality of data lanes, where each data stream includes alignment markers delineating data frames, and each alignment marker has a predefined bit pattern (302). For example, the predefined bit pattern may include a number of 4-bit sequences, such as 12 4-bit sequences. For each respective data lane, a determination may be made whether or not a specified portion of the received data stream has at least a threshold degree of similarity with a portion of the predefined bit pattern (304). The specified portion of the received data stream may be shorter than the predefined bit pattern of the alignment markers. In some implementations, the determination may be made using the partial correlators 210 of FIG. 2. For example, determining whether or not the specified portion of the received data stream has the threshold degree of similarity may include determining whether or not at least a threshold number of 4-bit sequences of the specified portion of the data stream match corresponding 4-bit sequences of the predefined bit pattern. In some implementations, the specified portion of the data stream includes 6 4-bit sequences and the threshold number of 4-bit sequences includes 3 4-bit sequences. In other implementations, the specified portion of the data stream includes 7 4-bit sequences and the threshold number of 4-bit sequences includes 4 4-bit sequences. In further implementations, the specified portion of the data stream includes 8 4-bit sequences and the threshold number of 4-bit sequences includes 5 4-bit sequences. In yet further implementations, the specified portion of the data stream includes 9 4-bit sequences and the threshold number of 4-bit sequences includes 6 4-bit sequences.

In response to determining, for one of the plurality of data lanes, that the specified portion has at least the threshold degree of similarity, a frame boundary may be determined for the received data stream (306) and a verification may be made that the specified portion of the received data stream corresponds to an alignment marker (308). In some implementations, the frame boundary may be determined using control 220 or shifter 230 of FIG. 2, and the verification may be made using full correlator 123. For example, the verification may include determining that the specified portion of the data stream is part of a contiguous sequence of 12 4-bit sequences wherein at least 9 4-bit sequences match corresponding 4-bit sequences of the predefined bit pattern.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for detecting alignment markers in data streams received via a plurality of data lanes, comprising:
   receiving corresponding data streams via respective data lanes in the plurality of data lanes, each data stream including alignment markers delineating data frames, each of the alignment markers having a predefined bit pattern of 12 4-bit sequences;
   for each respective data lane, determining whether or not at least a threshold number of 4-bit sequences of a specified portion of the data stream match corresponding 4-bit sequences of a portion of the predefined bit pattern, the specified portion of the data stream and the portion of the predefined bit pattern each being shorter than three-quarters of the predefined pattern, and the threshold number being at least three;
   in response to determining, for one of the plurality of data lanes, that the specified portion has at least the threshold number of matching 4-bit sequences:
      determining a frame boundary based on the specified portion;
      determining whether or not the specified portion is a part of a contiguous series of 12 4- bit sequences wherein at least 9 4-bit sequences match corresponding 4-bit sequences of the predefined bit pattern; and
      verifying that the specified portion of the received data stream corresponds to the alignment marker when the specified portion is a part of the contiguous series.

2. The method of claim 1, wherein the specified portion of the data stream comprises 6 4-bit sequences, and the threshold number of 4-bit sequences 3 4-bit sequences.

3. The method of claim 1, wherein the specified portion of the data stream comprises 7 4-bit sequences, and the threshold number of 4-bit sequences comprises 4 4-bit sequences.

4. The method of claim 1, wherein the specified portion of the data stream comprises 8 4-bit sequences, and the threshold number of 4-bit sequences comprises 5 4-bit sequences.

5. The method of claim 1, further comprising, in response to determining that the specified portion is part of the contiguous series, generating an indication that the specified portion of the received data stream corresponds to the alignment marker.

6. The method of claim 1, further comprising, in response to determining that the specified portion is not part of the contiguous series, generating an indication that the specified portion of the received data stream does not correspond to the alignment marker.

7. The alignment detection circuit of claim 1, wherein the full correlator is further configured to, in response to determining that the specified portion is not part of the contiguous series, generating an indication that the specified portion of the received data stream does not correspond to the alignment marker.

8. An alignment detection circuit, comprising:
a data input circuit configured to receive a plurality of data streams via a corresponding plurality of data lanes, each data stream including alignment markers delineating data frames, each of the alignment markers having a predefined bit pattern of 12 4-bit sequences;
a plurality of partial correlators, each of the partial correlators configured to receive a corresponding data stream and determine whether or not at least a threshold number of 4-bit sequences of a specified portion of the data stream match corresponding 4-bit sequences of a portion of the predefined bit pattern, the specified portion of the data stream and the portion of the predefined bit pattern each being shorter than three-quarters of the predefined pattern, and the threshold number being at least three;
an alignment adjustment circuit configured to adjust an alignment of each data stream of the plurality of data streams, wherein a given data stream's alignment is adjusted based on one of the partial correlators determining that the specified portion of the corresponding data stream has at least the threshold number of matching 4-bit sequences; and
a full correlator configured to determine whether or not the specified portion is a part of a contiguous series of 12 4-bit sequences wherein at least 9 4-bit sequences match corresponding 4-bit sequences of the predefined bit pattern, and to verify that the specified portion of the received data stream corresponds to the alignment marker when the specified portion is a part of the contiguous series.

9. The alignment detection circuit of claim 8, wherein the specified portion of the data stream comprises 6 4-bit sequences, and the threshold number of 4-bit sequences comprises 3 4-bit sequences.

10. The alignment detection circuit of claim 8, wherein the specified portion of the data stream comprises 7 4-bit sequences, and the threshold number of 4-bit sequences comprises 4 4-bit sequences.

11. The alignment detection circuit of claim 8, wherein the specified portion of the data stream comprises 8 4-bit sequences, and the threshold number of 4-bit sequences comprises 5 4-bit sequences.

12. The alignment detection circuit of claim 9, wherein the full correlator is further configured to, in response to determining that the specified portion is part of the contiguous series, generating an indication that the specified portion of the received data stream corresponds to the alignment marker.

13. An alignment detection circuit, comprising:
one or more processors; and
a memory storing instructions that, when executed by the one or more processors, cause the alignment detection circuit to perform operations comprising:
receiving corresponding data streams via respective data lanes in a plurality of data lanes, each data stream including alignment markers delineating data frames, each of the alignment markers having a predefined bit pattern of 12 4-bit sequences;
for each respective data lane, determining whether or not at least a threshold number of 4-bit sequences of a specified portion of the data stream match corresponding 4-bit sequences of a portion of the predefined bit pattern, the specified portion of the data stream and the portion of the predefined bit pattern each being shorter than three-quarters of the predefined pattern, and the threshold number being at least three; and
in response to determining, for one of the plurality of data lanes, that the specified portion has at least the threshold number of matching 4-bit sequences:
determining a frame boundary based on the specified portion;
determining whether or not the specified portion of the received data stream is a part of a contiguous series of 12 4-bit sequences wherein at least 9 4-bit sequences match corresponding 4-bit sequences of the predefined bit pattern; and
verifying that the specified portion of the received data stream corresponds to the alignment marker when the specified portion is a part of the contiguous series.

14. The alignment detection circuit of claim 13, wherein the specified portion of the data stream comprises 8 4-bit sequences, and the threshold number of 4-bit sequences comprises 5 4-bit sequences.

15. The alignment detection circuit of claim 13, wherein execution of the instructions causes the alignment detection circuit to perform operations further comprising, in response to determining that the specified portion is part of the contiguous series, generating an indication that the specified portion of the received data stream corresponds to the alignment marker.

16. The alignment detection circuit of claim 13, wherein execution of the instructions causes the alignment detection circuit to perform operations further comprising, in response to determining that the specified portion is not part of the contiguous series, generating an indication that the specified portion of the received data stream does not correspond to the alignment marker.

17. The alignment detection circuit of claim 13, wherein the specified portion of the data stream comprises 6 4-bit sequences, and the threshold number of 4-bit sequences comprises 3 4-bit sequences.

18. The alignment detection circuit of claim 13, wherein the specified portion of the data stream comprises 7 4-bit sequences, and the threshold number of 4-bit sequences comprises 4 4-bit sequences.

* * * * *